US008444289B2

(12) United States Patent  
Popper et al.

(10) Patent No.: US 8,444,289 B2
(45) Date of Patent: May 21, 2013

(54) COMBINATION HEADLAMP AND FLASHLIGHT ASSEMBLY AND METHOD OF USE

(75) Inventors: Richard S. Popper, Scottsdale, AZ (US); Jensen Jorgensen, Scottsdale, AZ (US)

(73) Assignee: XGlow P/T, LLC, Scottsdale, AZ (US)

( * ) Notice: Subject to any disclaimer, the term of this patent is extended or adjusted under 35 U.S.C. 154(b) by 0 days.

(21) Appl. No.: 13/536,739

(22) Filed: Jun. 28, 2012

(65) Prior Publication Data

US 2013/0033886 A1    Feb. 7, 2013

Related U.S. Application Data

(60) Provisional application No. 61/514,013, filed on Aug. 1, 2011.

(51) Int. Cl.
*F21L 4/00* (2006.01)
(52) U.S. Cl.
USPC .............................. 362/191; 362/164; 362/106
(58) Field of Classification Search .................. 362/188, 362/189, 190, 191, 194, 104, 106
See application file for complete search history.

(56) References Cited

U.S. PATENT DOCUMENTS

| | | | |
|---|---|---|---|
| 1,900,906 A | 3/1933 | Brown | |
| 2,071,557 A | 2/1937 | Yasutaka Miyaoka et al. | |
| 4,317,162 A | 2/1982 | Richards | |
| 4,794,496 A * | 12/1988 | Lanes et al. | 362/105 |
| 4,916,596 A | 4/1990 | Sharrah et al. | |
| 5,570,948 A | 11/1996 | Menke et al. | |
| 5,853,241 A | 12/1998 | Sharrah et al. | |
| 6,848,804 B2 * | 2/2005 | Webber | 362/105 |
| 6,953,260 B1 * | 10/2005 | Allen | 362/194 |
| 7,635,195 B2 | 12/2009 | Tarter | |
| 2004/0257035 A1 | 12/2004 | Chang | |
| 2008/0117623 A1 * | 5/2008 | Tarter | 362/106 |
| 2008/0253109 A1 | 10/2008 | Canino et al. | |
| 2008/0298048 A1 | 12/2008 | Garrity et al. | |
| 2009/0097258 A1 | 4/2009 | Tseng et al. | |
| 2009/0129064 A1 | 5/2009 | Zeller | |

(Continued)

FOREIGN PATENT DOCUMENTS

KR    10-2010-0070756    6/2010

OTHER PUBLICATIONS

PCT/US2012/048393, International Search Report, Korean Intellectual Property Office, Feb. 1, 2013.

*Primary Examiner* — Jong-Suk (James) Lee
*Assistant Examiner* — Leah S Macchiarolo
(74) *Attorney, Agent, or Firm* — Stephen C. Beuerle; Procopio Cory Hargreaves & Savitch LLP

(57) ABSTRACT

A combination headlamp and flashlight assembly includes a headlamp base; a headlamp head including a light source; a battery case, and a battery. The combination headlamp and flashlight assembly is changeable between a headlamp configuration and a handheld flashlight configuration. In the headlamp configuration, the headlamp head is mechanically and electrically coupled to the headlamp base to form a headlamp, the battery case carries the battery, and the battery case is electrically coupled to the headlamp base for powering the light source with the battery to provide illumination. In the handheld flashlight configuration, the headlamp head is mechanically and electrically coupled to the battery to form a handheld flashlight where the battery forms a handle and body of the handheld flashlight and powers the light source to provide illumination.

11 Claims, 3 Drawing Sheets

U.S. PATENT DOCUMENTS

2009/0207591 A1* 8/2009 Kumthampinij et al. ..... 362/105
2010/0277894 A1* 11/2010 Kim ............................. 362/105
2012/0182748 A1* 7/2012 McCaslin et al. ............. 362/473
2012/0236543 A1* 9/2012 Torgerson .................... 362/106

* cited by examiner

COMBINATION HEADLAMP AND FLASHLIGHT ASSEMBLY AND METHOD OF USE

CROSS-REFERENCE TO RELATED APPLICATION

This application claims the benefit of provisional application No. 61/514,013, filed on Aug. 1, 2011, which is hereby incorporated herein by reference.

FIELD OF THE INVENTION

The present invention relates to combination headlamps and flashlight assemblies.

BACKGROUND OF THE INVENTION

Combination headlamp and flashlight assemblies that are changeable between a headlamp and a handheld flashlight have been proposed in the past. One of the problems with these prior combination headlamp and flashlight assemblies is that one needed to undo screws/bolts to be able to remove the head of the light or change the head into a headlamp/handheld light. Another problem with these prior combination headlamp and flashlight assemblies is that in some versions the head is permanently connected to the body with a cable so one has to first fit the cable into a compartment before fitting the head and body to together. This is a very cumbersome way to assemble the flashlight.

These problems and others are addressed by the combination headlamp and flashlight assembly of the present invention.

SUMMARY OF THE INVENTION

An aspect of the invention involves a headlamp and flashlight assembly changeable between a headlamp and a handheld flashlight. The assembly includes a headlamp base, a headlamp head, a battery case, and a battery. The headlamp head is a light source of the assembly. The headlamp head is separately and operatively connectable directly to the battery to form a handheld flashlight in a handheld flashlight configuration of the assembly. The headlamp head is also separately and operatively connectable directly to the headlamp base to form a headlamp in a headlamp configuration of the assembly. In the handheld flashlight configuration of the assembly, the battery forms the hand-holdable portion or body of the handheld flashlight, and powers the headlamp head to provide illumination. The battery case is adapted to receive and hold the battery to form a power pack. The headlamp base is connected to a head strap to encircle and secure the head of a user, and is also operatively connected to and between the power pack and the headlamp head to supply power from the power pack to the headlamp base for powering the headlamp head in the headlamp configuration of the assembly to provide illumination in the headlamp configuration of the assembly.

Another aspect of the invention involves a combination headlamp and flashlight assembly including a headlamp base; a headlamp head including a light source; a battery case, and a battery. The combination headlamp and flashlight assembly is changeable between a headlamp configuration and a handheld flashlight configuration. In the headlamp configuration, the headlamp head is mechanically and electrically coupled to the headlamp base to form a headlamp, the battery case carries the battery, and the battery case is electrically coupled to the headlamp base for powering the light source with the battery to provide illumination. In the handheld flashlight configuration, the headlamp head is mechanically and electrically coupled to the battery to form a handheld flashlight where the battery forms a handle and body of the handheld flashlight and powers the light source to provide illumination.

One or more implementations of the aspect of the invention described immediately above include one or more of the following: a head strap connected to the headlamp base to encircle and secure the headlamp to a head of a user; the headlamp base includes a headlamp base locking element, the headlamp head includes a headlamp head locking element, the battery case includes a battery case locking element, and the battery includes a battery locking element, the headlamp head locking element locking element and the headlamp base locking element detachably connectable to each other, the battery locking element and the battery case locking element detachably connectable to each other, and the headlamp head locking element and the battery locking element detachably connectable to each other; the headlamp base locking element, the headlamp head locking element, the battery case locking element, and the battery locking element include one or more electrically conductive terminals; the headlamp base locking element, the headlamp head locking element, the battery case locking element, and the battery locking element include at least one of an elongate tongue and an elongate tongue receiving channel; the light source includes one or more LEDs; the combination headlamp and flashlight assembly includes an on/off switch to turn the light source on and off; mechanically and electrically coupling the headlamp head to the headlamp base to form a headlamp, which is electrically coupled to the battery case, mechanically and electrically coupling the battery to the battery case; donning the headlamp on a head of a user, and powering the light source with the battery to provide illumination; mechanically and electrically decoupling the headlamp head from the headlamp base and mechanically and electrically decoupling the battery from the battery case; mechanically and electrically coupling the headlamp head to the battery to form a flashlight, hand holding the flashlight by the battery, and powering the light source with the battery to provide illumination.

A further aspect of the invention involves a flashlight. The flashlight includes a headlamp head including a light source and a headlamp head locking element with one or more terminals; and a battery including a battery locking element with one or more terminals. The battery locking element is mechanically and electrically coupleable and decoupleable with respect to the headlamp head locking element to form a handheld flashlight where the battery forms a handle and body of the handheld flashlight and powers the light source to provide illumination.

One or more implementations of the aspect of the invention described immediately above include one or more of the following: the headlamp head includes a headlamp head locking element, the battery includes a battery locking element, the headlamp head locking element locking element and the battery locking element are detachably connectable to each other; the headlamp head locking element and the battery include one or more electrically conductive terminals; the headlamp head locking element and the battery include at least one of an elongate tongue and an elongate tongue receiving channel; the light source includes one or more LEDs; the flashlight includes an on/off switch to turn the light source on and off; mechanically and electrically coupling and decoupling the battery locking element with respect to the headlamp head locking element to form a handheld flashlight where the battery forms a handle and body of the handheld flashlight and powering the light source to provide illumination.

DETAILED DESCRIPTION OF THE PREFERRED EMBODIMENTS

Figure 1:
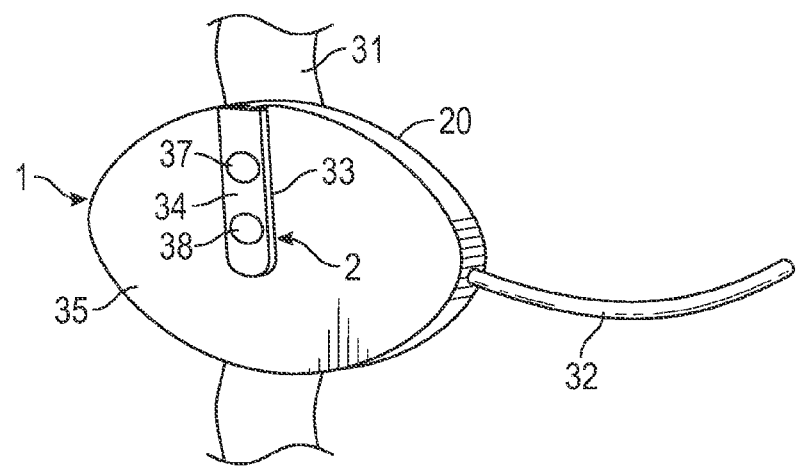
FIG. 1 is a perspective view of a headlamp base of a headlamp and flashlight assembly.

Turning now to the drawings, in which like reference characters indicate corresponding elements throughout the several views, a headlamp and flashlight assembly 10 changeable between a headlamp 25 and a handheld flashlight 26 is disclosed. The assembly 10 includes a headlamp base 20, a headlamp head 21, a battery case 22, and a battery 23. The headlamp head 21 is a light source of the assembly 10. The headlamp head 21 is separately and operatively connectable directly to the battery 23 to form a handheld flashlight 26 in a handheld flashlight configuration of the assembly 10. The headlamp head 21 is also separately and operatively connectable directly to the headlamp base 20 to form a headlamp 25 in a headlamp configuration of the assembly 10. In the handheld flashlight configuration of the assembly 10, the battery 23 forms the hand-holdable portion or body of the handheld flashlight 26, and powers the headlamp head 21 to provide illumination. The battery case 22 is adapted to receive and hold the battery 23 to form a power pack. The headlamp base 20 is connected to a head strap 31 to encircle and secure the head of a user, and is also operatively connected to and between the battery case 22 of the power pack and the headlamp head 21 to supply power from the battery 23 to the headlamp base 20 for powering the headlamp head 21 in the headlamp configuration of the assembly 10 to provide illumination in the headlamp configuration of the assembly 10.

Headlamp base 20 is formed plastic or other material having the properties of resiliency, rigidity, and impact resistance, and is of unitary construction formed through molding or machining. In an alternate embodiment, headlamp base 20 is formed of a plurality of separate parts joined with adhesive, welding, one or more fasteners such as one or more rivets or screws, or the like. Headlamp base 20 is a broad and planar and generally ellipsoidal in overall shape as a matter of example, and is formed with an attached, conventional head strap 31 and conventional internal circuitry coupled between a power cord 32 and an electrode 33 associated with a locking element 34. Base 20 is formed with an outer or exterior face 35, which, in turn, is formed with electrode 33 and locking element 34. In this embodiment, electrode 33 is a conductive strip that is plated in place or adhered with adhesive, and locking element 34 is an elongate tongue and is exemplary of a male engagement element. The conductive strip forming electrode 33 runs along the outer marginal extremity of the elongate tongue forming locking element 34. Alternatively, or additionally, the locking element 34 may include terminals 37, 38.

Figure 5:
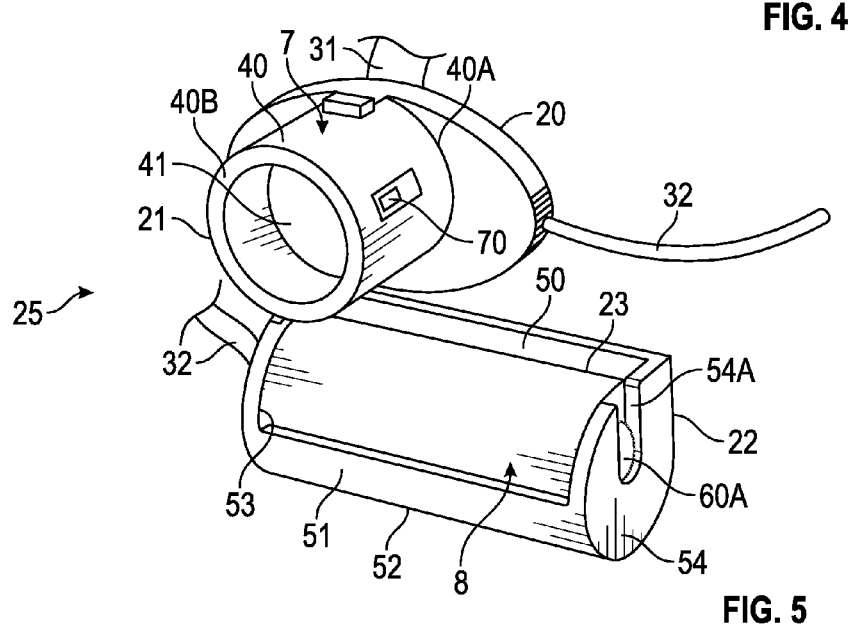
FIG. 5 is a perspective view of a headlamp and flashlight assembly incorporating the headlamp base of FIG. 1 operatively connected to the headlamp head of FIG. 2, and the battery case of FIG. 3 operatively coupled to the battery of FIG. 4.
Figure 7:
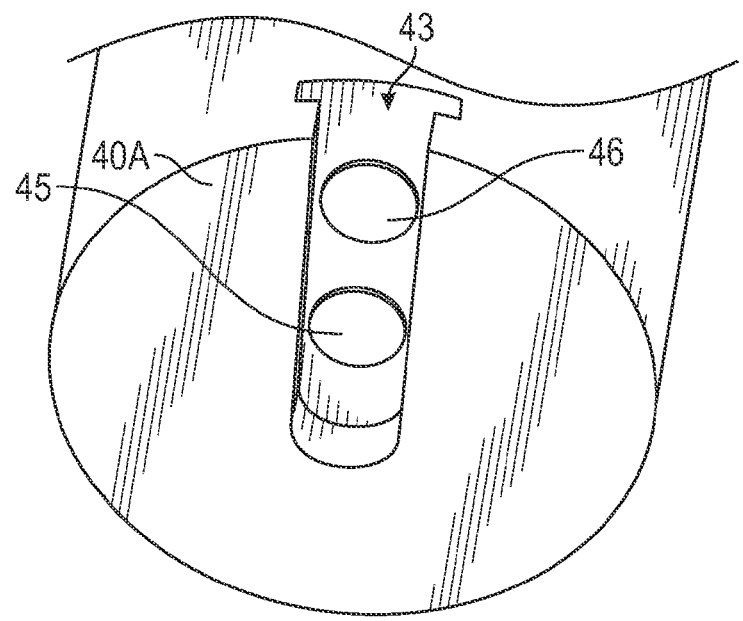
FIG. 7 is an end perspective view of inner end of headlamp head and shows a locking element therein.

Electrode 33 and locking element 34 operatively connect headlamp head 21 to headlamp base 20, namely, secure headlamp head 21 to headlamp base 20 and electrically connect headlamp head 21 to headlamp base 20. Headlamp head 21 is a light fixture consisting essentially of a housing 40 having opposed inner and outer ends 40A and 40B, and which is formed with an internal light source and a light-transmitting lens 41 between inner and outer ends 40A and 40B. Housing 40 is formed of plastic or other material having the properties of resiliency, rigidity, and impact resistance, and is of unitary construction formed through molding or machining. In an alternate embodiment, housing 40 is formed of a plurality of separate parts joined with adhesive, welding, one or more fasteners such as one or more rivets or screws, or the like. The light source formed in housing 40 consists of a light-emitting diode ("LED"). LED 40 is preferably a full-spectrum LED and it may be a limited spectrum LED if desired. In an alternate embodiment, the light source formed in housing 40 consists of a plurality of LEDS. Housing 40 is formed with conventional internal circuitry coupled between the internal light source and an electrode 42 associated with a locking element 43 formed in inner end 40A of housing 40. As shown in FIG. 7, the locking element 43 may be an elongate tongue receiving recess/channel with terminals 45, 46 therein. In this embodiment, electrode 42 is a conductive strip that is plated in place or adhered with adhesive and locking element 43 is an elongate groove and is exemplary of a female engagement element. The conductive strip forming electrode 42 runs along the outer marginal extremity of the elongate groove forming locking element 43. Electrode 42 formed in housing 40 complements and corresponds to electrode 33 formed in headlamp base 20, and the elongate groove that forms locking element 43 formed in housing 40 complements and corresponds to the elongate tongue that forms locking element 33 formed in headlamp base 20. Locking elements 34 and 43 are complementing engagement/locking pairs. Electrode 33 and locking element 34 formed in headlamp base 20, and electrode 42 and locking element 43 formed in housing 40 form a locking assembly that detachably and electrically or operatively secures headlamp head 21 to headlamp base 30 as shown in FIG. 5.

Figure 3:
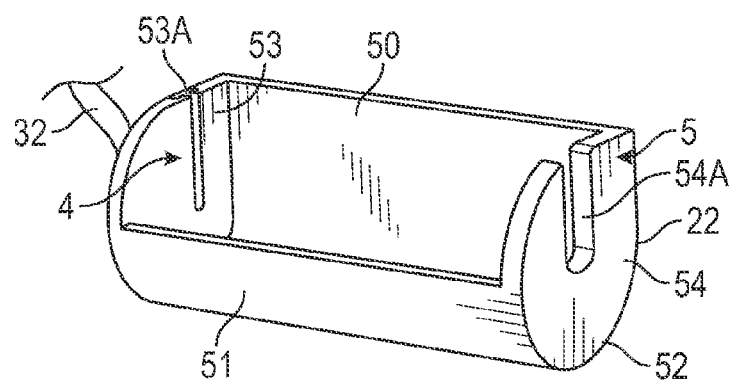
FIG. 3 is a perspective view of a battery case of a headlamp and flashlight assembly.

Power cord 32 is electrically connected between headlamp base 20 and battery case 22 depicted in FIG. 3. Battery case 22 is formed plastic or other material having the properties of resiliency, rigidity, and impact resistance, and is of unitary construction formed through molding or machining. In an alternate embodiment, battery case 22 is formed of a plurality of separate parts joined with adhesive, welding, one or more fasteners such as one or more rivets or screws, or the like. Battery case 22 consists of a cradle 55 defined and formed by opposed sidewalls 50 and 51 that are integral with a closed, curvilinear bottom 42, which together extend between opposite end walls 53 and 54. End walls 53 and 54 are formed with electrical terminals 53A and 54A, respectively. Battery case 22 is formed with conventional internal circuitry coupled between power cord 32 and opposed terminals 53A and 54A electrically connecting terminals 53A and 54A to the internal circuitry of headlamp base 20 and to electrode 33 formed in headlamp base 20.

Figure 4:
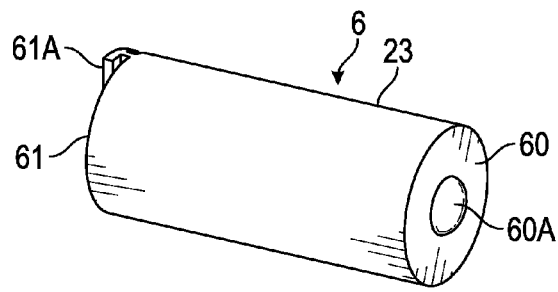
FIG. 4 is a perspective view of a battery of a headlamp and flashlight assembly.
Figure 8:
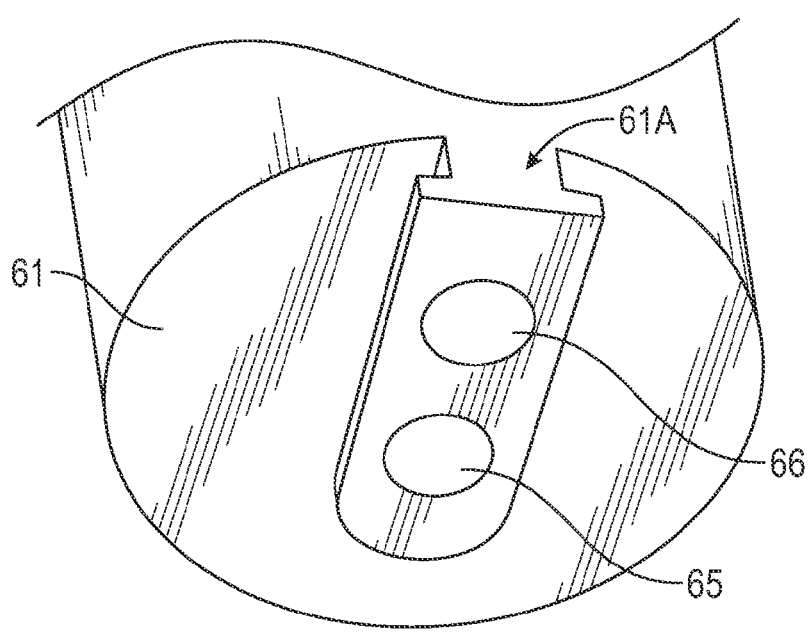
FIG. 8 is an end perspective view of an end of battery and shows a locking element thereon.

Looking to FIG. 4, battery pack 23 is elongate and has opposed ends 60 and 61. End 60 of battery pack 23 is formed with terminal(s) 60A, and end 61 of battery pack 23 is formed with a locking element 61A. As shown in FIG. 8, the locking element 61A may be an elongate tongue forming locking element with terminals 65, 66 thereon. Battery pack 23 is preferably a rechargeable lithium-ion battery pack, and may be provided in any suitable battery pack form so as to operate according to this disclosure without departing from the invention. In shape and form, locking element 61A is an elongate tongue identical to the shape and form of locking element 34 of headlamp base 20 and, thus, constitutes a locking element of battery pack 23. Battery pack 23 is a handheld battery pack, namely, a battery pack that is small enough to be used or operated while being held in the hand. In a preferred embodiment, battery pack 23 is three inches long from end 60 to end 61, and is one inch in diameter. This preferred handheld size of battery pack 23 is exemplary of a handheld battery pack, and battery pack 23 may be provided in other handheld sizes.

Battery case 22 receives, holds, and operatively connects battery pack 23, namely, secures battery pack 23 and electrically connects battery pack 23 to terminals 53A and 54A, which electrically connects battery pack 23 to the internal circuitry of battery case 22 and thus to power cord 32 and to the internal circuitry of headlamp base 20 and to electrode 33 formed in headlamp base 20. Cradle 55 has a shape and size that corresponds to the shape and size of battery pack 23. To install battery pack 23 into battery case 22 so as to operatively connect battery pack 23 to battery case 22, battery pack 23 is taken up and set into cradle 23 as shown in FIG. 5. Battery pack 23 extends into and through cradle 55 and is captured by and between end walls 53 and 54. End 60 of battery pack 23 is directed toward and against the inner side of end wall 54, and end 61 of battery pack 23 is directed toward and against the inner side of end wall 53. Terminal(s) 60A is/are slid into and received by and electrically connects terminal(s) 54A formed in end wall 54, and locking element 61A is slid into and received by and electrically connects terminal(s) 53A, which may be similar to terminals 45, 46 shown and described herein, formed in end wall 53. The electrical connection of terminal(s) 60A to terminal(s) 54A of battery case 22 and the electrical connection of terminals 65, 66 of locking element 61A to terminal(s) 53A of battery case 22 electrically connects battery pack 23 to terminals 54A and 53A, which electrically connects battery pack 23 to the internal electrical circuitry of battery case 22 and to power cord 32 and further to the electrical components of headlamp base 20 previously discussed to provide electrical power to electrode 33 formed in headlamp base 20. The installation of battery pack 23 to battery case 22 as shown in FIG. 5 forms a battery pack assembly.

Figure 6:
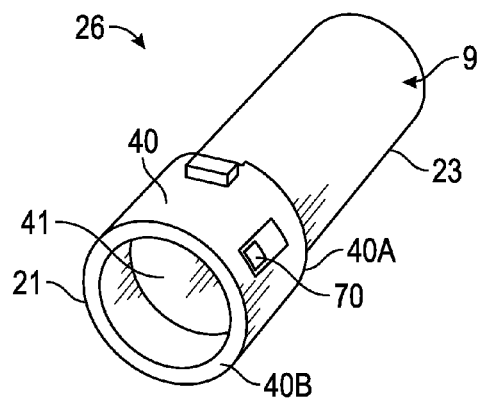
FIG. 6 is a perspective view of a flashlight including the battery of FIG. 4 operatively connected to the headlamp head of FIG. 2.
Figure 9:
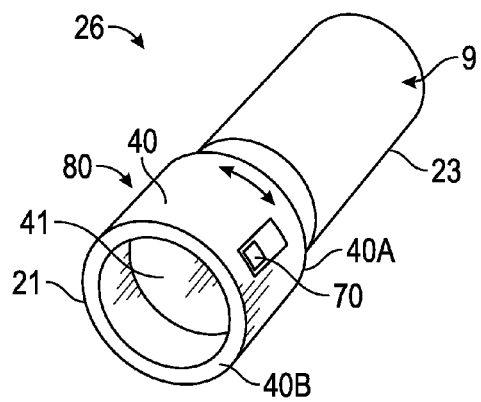
FIG. 9 is a perspective view of the flashlight of FIG. 6, but with twist-on fasteners 80 as an alternative locking/engagement pair.

In shape and form locking element 61A of battery pack 23 is identical to that of locking element 34 of headlamp base 20 and constitutes a locking element of battery pack 23 that complements locking element 43 of headlamp head 21. Locking element 61A is thus adapted to secure and electrically or operatively connect headlamp head 21. Electrode 42 formed in housing 40 complements and corresponds to locking element 61A of battery pack 23, and locking element 43 formed in housing 40 complements and corresponds to the locking element 61A formed in battery pack 23. Locking element 61A formed in end 61 of battery pack 23, and electrode 42 and locking element 43 formed in housing 40 form a locking assembly that detachably and electrically or operatively secures headlamp head 21 to battery pack 23 as shown in FIG. 6. Locking element 61A of battery pack 23 and locking element 43 of headlamp head 21 are exemplary of complementing engagement/locking pairs of a locking assembly that detachably secures and electrically connects locking element 61A to headlamp head 21 as shown in FIG. 6.

Figure 2:
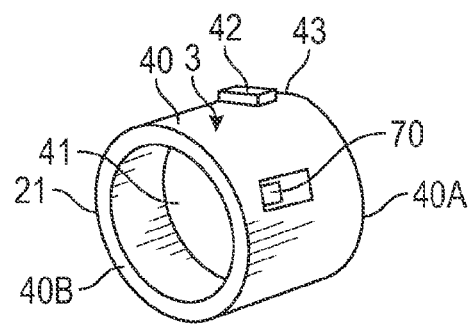
FIG. 2 is a perspective view of a headlamp head of a headlamp and flashlight assembly.

The headlamp and flashlight assembly is changeable between a headlamp configuration forming a headlamp 25 as shown in FIG. 5, and a flashlight configuration forming a handheld flashlight 26 as shown in FIG. 6. In the headlamp configuration forming headlamp 25 as shown in FIG. 5, headlamp base 20 of FIG. 1 is operatively connected to headlamp head 21 of FIG. 2 and battery case 22 of FIG. 3 is operatively coupled to battery pack 23 of FIG. 4 forming headlamp 25 in the headlamp configuration of the headlamp and flashlight assembly. To operatively couple or connect headlamp head 21 to headlamp base 20, the elongate tongue forming locking element 34 in headlamp base 20 and the elongate groove forming locking element 43 in headlamp head 21 are simply slide together, which secures the corresponding engagement pairs together and brings electrode 33 of headlamp base 20 into intimate electrical contact with electrode 42 of headlamp head 21 thereby electrically connecting headlamp head 21 to battery pack 23 operatively coupled to battery case 22, which energizes the light source of headlamp head 21 to provide illumination. As locking element 43 is formed in inner end 40A of headlamp head 21 and corresponding locking element 34 is formed along exterior face 35 of headlamp base 20, in the attachment of locking element 43 of headlamp head 21 to locking element 34 of headlamp base 20 inner end 40A of headlamp base 20 is received directly against exterior face 35 of headlamp base 20. In this headlamp configuration, head strap 31 may be applied about the head of a user to secure headlamp base 20 to the user's head to provide illumination from headlamp head 21 operatively connected to headlamp base 20. If desired, a switch may be incorporated to allow a user to turn headlamp head 21 OFF and ON. As a matter of example, FIGS. 2 and 5 shown a switch 70 formed in headlamp head 21, which is movable between an ON position closing an internal circuit so as to turn headlamp head 21 ON to provide illumination, and an OFF position opening an internal circuit so as to turn headlamp head 21 OFF. Switch 70 is a conventional toggle switch, and any suitable switch form may be used without departing from the invention. Also, although switch 70 is formed with headlamp head 21, it may be formed elsewhere, such as with headlamp base 20, battery case 22, power cord 32, or battery pack 23. In the headlamp configuration of the headlamp and flashlight assembly, the battery pack assembly consisting of battery pack 23 installed with battery case 22 may be carried in the user's pocket, clipped to a garment worn by the user, etc.

In the handheld flashlight configuration forming handheld flashlight 26, after detaching headlamp head 21 from headlamp base 20/head strap 31 (so that neither headlamp base 20 nor head strap 31 are connected to headlamp head 21), battery/battery pack 23 is removed from battery case 22 and is operatively connected to headlamp head 21 forming handheld flashlight 26 as shown in FIG. 6. To operatively couple or connect headlamp head 21 to battery pack 23, the elongate tongue of locking element 61A forming the locking element in battery pack 23 and the elongate groove forming locking element 43 in headlamp head 21 are simply slide together, which secures the corresponding engagement pairs together and brings electrode 42 of headlamp head 21 into intimate electrical contact with locking element 61A of battery pack 23 thereby electrically directly connecting headlamp head 21 to battery pack 23, which energizes the light source of headlamp head 21 to provide illumination. As battery pack 23 is sized so as to be available and suitable to be taken up and held by hand as previously discussed, battery pack 23 of handheld flashlight 26 may simply be taken up by hand and used to direct illumination by hand from headlamp head 21 as is desired. If desired, a switch may be incorporated to allow a user to turn headlamp head 21 OFF and ON in flashlight 26. As a matter of example, FIG. 6 shows switch 70 formed in headlamp head 21, which is movable between an ON position closing an internal circuit so as to turn headlamp head 21 ON to provide illumination, and an OFF position opening an internal circuit so as to turn headlamp head 21 OFF. Again, switch 70 is a conventional toggle switch, and any suitable switch form may be used without departing from the invention. Also, although switch 70 is formed with headlamp head 21, it may be formed elsewhere, such as with battery pack 23.

The present invention is described above with reference to a preferred embodiment. However, those skilled in the art will recognize that changes and modifications may be made in the described embodiment without departing from the nature and scope of the present invention. For instance, any suitable electrode structure may be incorporated in and between headlamp base 20 and headlamp head 21 without departing from the invention. Also, the relative position of the corresponding male and female engagement pairs of the locking/engagement assemblies disclosed herein can be reversed without departing from the invention. Although corresponding male and female engagement pairs are disclosed as being exemplary of preferred locking/engagement pairs, other forms of locking/engagement pairs can be used without departing from the invention, such as corresponding snap fasteners, twist-on fasteners, etc. Furthermore, any suitable light source, whether a single light element or a plurality of light elements, can be used for the light source of headlamp head 21.

While illustrative embodiments of the invention are disclosed herein, it will be appreciated that numerous modifications and other embodiments can be devised by those skilled in the art. Features of the embodiments described herein, can be combined, separated, interchanged, and/or rearranged to generate other embodiments. Therefore, it will be understood that the appended claims are intended to cover all such modifications and embodiments that come within the spirit and scope of the present invention.

What is claimed is:

1. A combination headlamp and flashlight assembly, comprising:
    a headlamp base including a single locking element that electrically and mechanically connects;
    a headlamp head including a light source, the headlamp head including a single locking element that electrically and mechanically connects; and
    a combination handle and battery pack including a single locking element that electrically and mechanically connects,
    wherein the combination headlamp and flashlight assembly is changeable between a headlamp configuration and a handheld flashlight configuration, in the headlamp configuration the single locking element of the headlamp head is mechanically and electrically coupled to the single locking element of the headlamp base to form a headlamp, and the combination handle and battery pack is electrically coupled to the headlamp base for powering the light source to provide illumination, and in the handheld flashlight configuration the single locking element of the headlamp head is mechanically and electrically coupled to the single locking element of the combination handle and battery pack to form a handheld flashlight where the combination handle and battery pack forms a handle and body of the handheld flashlight and powers the light source to provide illumination.

2. The combination headlamp and flashlight assembly of claim 1, further including a head strap connected to the headlamp base to encircle and secure the headlamp to a head of a user.

3. The combination headlamp and flashlight assembly of claim 1, wherein the headlamp base locking element, the headlamp head locking element, and the battery locking element include at least one of an elongate tongue and an elongate tongue receiving channel for mechanical connection and respective electrically conductive terminals for electrical connection.

4. The combination headlamp and flashlight assembly of claim 1, wherein the headlamp base locking element, the headlamp head locking element, and the battery locking element each include one or more electrically conductive terminals.

5. The combination headlamp and flashlight assembly of claim 1, wherein the headlamp base locking element, the headlamp head locking element, and the battery locking element each include at least one of an elongate tongue and an elongate tongue receiving channel.

6. The combination headlamp and flashlight assembly of claim 1, wherein the light source includes one or more LEDs.

7. The combination headlamp and flashlight assembly of claim 1, wherein the combination headlamp and flashlight assembly includes an on/off switch to turn the light source on and off.

8. A method of using the combination headlamp and flashlight assembly of claim 1, comprising:
    mechanically and electrically coupling the headlamp head to the headlamp base via respective single locking elements of the headlamp head and the headlamp base to form a headlamp, mechanically and electrically coupling the combination handle and battery pack to the headlamp base via respective single locking elements of the pack and the headlamp base; donning the headlamp on a head of a user, and powering the light source with the combination handle and battery pack to provide illumination;
    mechanically and electrically decoupling the headlamp head from the headlamp base;
    mechanically and electrically coupling the headlamp head to the combination handle and battery pack via respective single locking elements of the headlamp head and the pack to form a flashlight, hand holding the flashlight by the combination handle and battery pack, and powering the light source with the combination handle and battery pack to provide illumination.

9. The combination headlamp and flashlight assembly of claim 1, wherein the headlamp base locking element, the headlamp head locking element, and the battery locking element are twist-on fasteners.

10. A flashlight, comprising:
    a headlamp head including a light source and a single headlamp head locking element that electrically and mechanically connects and includes one or more terminals;
    a combination handle and battery pack including a single battery locking element that electrically and mechanically connects and includes one or more terminals,
    wherein the single battery locking element is mechanically and electrically coupleable and decoupleable with respect to the single headlamp head locking element to form a handheld flashlight where the combination handle and battery pack forms a handle and body of the handheld flashlight and powers the light source to provide illumination.

11. A method of using the flashlight of claim 10, comprising:
  mechanically and electrically coupling the single battery locking element with respect to the single headlamp head locking element to form a handheld flashlight where the combination handle and battery pack forms a handle and body of the handheld flashlight; and
  powering the light source to provide illumination.

\* \* \* \* \*